United States Patent
Abdalla

(10) Patent No.: US 12,030,005 B2
(45) Date of Patent: Jul. 9, 2024

(54) SELF SUFFICIENT SUCTION SIDE AUTOMATIC DRAIN VALVE

(71) Applicant: CUMMINS FILTRATION IP, INC., Columbus, IN (US)

(72) Inventor: Wassem Abdalla, Fishers, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 404 days.

(21) Appl. No.: 17/276,350

(22) PCT Filed: Sep. 16, 2019

(86) PCT No.: PCT/US2019/051239
§ 371 (c)(1),
(2) Date: Mar. 15, 2021

(87) PCT Pub. No.: WO2020/060897
PCT Pub. Date: Mar. 26, 2020

(65) Prior Publication Data
US 2022/0040611 A1    Feb. 10, 2022

Related U.S. Application Data

(60) Provisional application No. 62/733,875, filed on Sep. 20, 2018.

(51) Int. Cl.
*B01D 36/00* (2006.01)
*B01D 17/04* (2006.01)
(Continued)

(52) U.S. Cl.
CPC ......... *B01D 36/005* (2013.01); *B01D 17/045* (2013.01); *B01D 17/12* (2013.01);
(Continued)

(58) Field of Classification Search
CPC .... B01D 36/005; B01D 17/045; B01D 17/12; B01D 36/006; B01D 2201/167;
(Continued)

(56) References Cited

U.S. PATENT DOCUMENTS

| 4,253,954 A | 3/1981 | Midkiff et al. |
| 5,149,433 A | 9/1992 | Lien |

(Continued)

FOREIGN PATENT DOCUMENTS

| CN | 1715636 | 1/2006 |
| CN | 107002603 | 8/2017 |

(Continued)

OTHER PUBLICATIONS

Final Office Action issued for U.S. Appl. No. 16/646,692 dated Feb. 25, 2022, 21 pages.
(Continued)

*Primary Examiner* — Madeline Gonzalez
(74) *Attorney, Agent, or Firm* — Foley & lardner LLP

(57) ABSTRACT

Various example embodiments relate to an automatic drain system for use with a fluid water separator. The automatic drain system includes a liquid-in-fuel sensor configured to detect a liquid level in a water sump. A pump includes an inlet in fluid communication with the water sump and an outlet in fluid communication with the inlet. The pump has an active state and an inactive state. The active state causes the pump to draw liquid in from the inlet and direct liquid toward the outlet. A battery is configured to power the pump. A circuit board is operably connected to the pump and battery. The circuit board includes at least one circuit having a first state and a second state. The first state prevents power flow from the battery to the pump. The second state facilitates power flow from the battery to the pump, transitioning the pump from inactive to active.

12 Claims, 8 Drawing Sheets

(51) Int. Cl.
*B01D 17/12* (2006.01)
*G05D 9/12* (2006.01)
*F02M 37/28* (2019.01)

(52) U.S. Cl.
CPC ............ *B01D 36/006* (2013.01); *G05D 9/12* (2013.01); *B01D 2201/167* (2013.01); *B01D 2201/302* (2013.01); *B01D 2201/4092* (2013.01); *F02M 37/28* (2019.01)

(58) Field of Classification Search
CPC ...... B01D 2201/302; B01D 2201/4092; B01D 35/157; B01D 35/16; B01D 36/001; G05D 9/12; F02M 37/28; F02M 37/44
USPC ....... 210/744, 85, 86, 91, 97, 103, 104, 117, 210/119, 121, 123, 128, 136, 143, 167.02, 210/242.1, 248, 299, 303, 416.1, 416.4, 210/416.5, 455, DIG. 5, 450, 493.2
See application file for complete search history.

(56) References Cited

U.S. PATENT DOCUMENTS

| | | | |
|---|---|---|---|
| 5,462,658 A | 10/1995 | Sem | |
| 5,494,410 A | 2/1996 | Maier-Laxhuber et al. | |
| 5,788,859 A | 8/1998 | Biere | |
| 5,951,862 A | 9/1999 | Bradford | |
| 6,270,659 B1 | 8/2001 | Bagci et al. | |
| 7,141,163 B2 | 11/2006 | Girondi | |
| 7,731,845 B2 | 6/2010 | Lampert et al. | |
| 8,231,779 B2 | 7/2012 | Jokschas et al. | |
| 8,343,344 B2 | 1/2013 | Reyinger et al. | |
| 8,540,873 B2 | 9/2013 | Lika | |
| 8,673,138 B2 | 3/2014 | Braunheim | |
| 2004/0221647 A1* | 11/2004 | Sabatino | G01F 23/242 361/749 |
| 2006/0086649 A1 | 4/2006 | Wieczorek et al. | |
| 2007/0039865 A1 | 2/2007 | Jiang et al. | |
| 2008/0245719 A1 | 10/2008 | Beard et al. | |
| 2009/0113880 A1* | 5/2009 | Clausen | F01N 13/009 210/348 |
| 2010/0219116 A1 | 9/2010 | Milum | |
| 2010/0294707 A1* | 11/2010 | Abdalla | B01D 35/1576 210/228 |
| 2011/0088800 A1 | 4/2011 | Core | |
| 2011/0147290 A1 | 6/2011 | Braunheim | |
| 2015/0182892 A1 | 7/2015 | Schweitzer | |
| 2017/0021295 A1 | 1/2017 | Willems et al. | |
| 2018/0291911 A1 | 10/2018 | Ward et al. | |
| 2020/0086241 A1 | 3/2020 | Downs | |

FOREIGN PATENT DOCUMENTS

| | | |
|---|---|---|
| JP | 2004-257314 | 9/2004 |
| WO | WO-2008/134494 | 11/2008 |
| WO | WO-2017/221226 | 12/2017 |
| WO | WO-2018/067437 | 4/2018 |

OTHER PUBLICATIONS

International Search Report and Written Opinion issued for PCT/US 2019/051239, dated Dec. 5, 2019, 13 pages.
International Search Report and Written Opinion issued for PCT/US2018/052537, dated Nov. 15, 2018, 8 pages.
First Office Action issued for Chinese Patent Application 2018800585806 dated May 21, 2021, 10 pages.

* cited by examiner

SELF SUFFICIENT SUCTION SIDE AUTOMATIC DRAIN VALVE

CROSS-REFERENCE TO RELATED APPLICATIONS

The present application is a National Phase of PCT Application No. PCT/US2019/051239, filed Sep. 16, 2019, claims priority to U.S. Provisional Patent Application No. 62/733,875, filed on Sep. 20, 2018. The contents of these applications are hereby incorporated by reference in their entirety.

FIELD

The present application relates generally to fuel water separator filter systems.

BACKGROUND

Fuel water separator filters that filter fuel, for example diesel fuel, and also separate water from the fuel before the fuel is passed to the engine are known. Various fuel water separator filter constructions are described in, for example, U.S. Pat. Nos. 7,857,974 and 7,935,255. When the water level rises to a certain level within the fuel water separator filter (e.g., fuel filter assembly), the water may carried by the fuel into the rest of the fuel system (e.g., into the fuel injectors), which causes damage to the fuel system and/or the engine system. Periodic draining of the water that is separated from the fuel by the fuel water separator filter is therefore generally required.

SUMMARY

Various example embodiments relate to an automatic drain system for use with a fluid water separator. The automatic drain system includes a liquid in-fuel sensor configured to detect a liquid level in a water sump. A pump includes an inlet in fluid communication with the water sump and an outlet in fluid communication with the inlet. The pump has an active state and an inactive state. The active state causes the pump to draw liquid in from the inlet and direct liquid toward the outlet. A battery is configured to power the pump. A circuit board is operably connected to the pump and the battery. The circuit board includes at least one circuit having a first state and a second state. The first state prevents power flow from the battery to the pump. The second state facilitates power flow from the battery to the pump. Detection of the liquid level by the liquid-in-fuel sensor causes the circuit board to transition from the first state to the second state, thereby causing the pump to transition from the inactive state to the active state.

Other example embodiments relate to a filtration system. The filtration system includes a filter housing defining an internal volume. The filter housing includes a housing first end and a housing second end positioned axially away from the housing first end. A filter element is positioned within the internal volume. The filter element includes a first endplate, a second endplate positioned axially away from the first endplate, and filter media extending from the first endplate toward the second endplate. The first endplate includes a liquid drain port that places the filter element in fluid communication with a water sump. The water sump is positioned at the housing first end. An automatic drain system coupled to the water sump. The automatic drain system includes a liquid in-fuel sensor configured to detect a liquid level in a water sump. A pump includes an inlet in fluid communication with the water sump and an outlet in fluid communication with the inlet. The pump has an active state and an inactive state. The active state causes the pump to draw liquid in from the inlet and direct liquid toward the outlet. A battery is configured to power the pump. A circuit board is operably connected to the pump and the battery. The circuit board includes at least one circuit having a first state and a second state. The first state prevents power flow from the battery to the pump. The second state facilitates power flow from the battery to the pump. Detection of the liquid level by the liquid-in-fuel sensor causes the circuit board to transition from the first state to the second state, thereby causing the pump to transition from the inactive state to the active state.

Additional example embodiments relate to a method of draining a water sump of a filtration system using an automatic drain system. The method includes passing a mixture through a filter media. The mixture includes water and a fuel. The filter media extends between a first endplate and a second endplate of a filter element. The second endplate is positioned axially away from the first endplate. The first endplate includes a liquid drain port that places the filter element in fluid communication with a water sump. The filter element is positioned within an internal volume of a filter housing. The filter housing includes a housing first end and a housing second end positioned axially away from the housing first end. Water from the mixture is captured and coalesced. The coalesced water passes through the liquid drain port into the water sump positioned at the housing first end. The water is in contact with a liquid-in-fuel sensor of an automatic drain system coupled to the water sump. The automatic drain system includes a liquid in-fuel sensor configured to detect a liquid level in a water sump. A pump includes an inlet in fluid communication with the water sump and an outlet in fluid communication with the inlet. The pump has an active state and an inactive state. The active state causes the pump to draw liquid in from the inlet and direct liquid toward the outlet. A battery is configured to power the pump. A circuit board is operably connected to the pump and the battery. The circuit board includes at least one circuit having a first state and a second state. The first state prevents power flow from the battery to the pump. A liquid level is detected by the liquid-in-fuel sensor. The circuit board transitions from the first state to the second state, thereby causing the pump to transition from the inactive state to the active state. The coalesced water is drained from the water sump.

BRIEF DESCRIPTION OF THE DRAWINGS

References are made to the accompanying drawings that form a part of this disclosure, and which illustrate the embodiments in which the systems and methods described in this specification can be practiced.

DETAILED DESCRIPTION

FWS filter systems (and filter systems generally) require the periodic draining of water that has been removed from the fuel and stored in a water sump. An FWS filter system may include a fuel pump, an FWS filter element, and a filter housing including a water sump. The failure to drain the separated water from the water sump may result in system failures, resulting in attendant repair and maintenance costs. The automatic drain systems described herein operate independently of user control to drain the water from an FWS. Such systems thus remove the possibility that a user's failure to drain the water from an FWS system may result in increased maintenance and repair costs. Specifically, the automatic drain system is structured to monitor collected liquid levels in the liquid collection sump, or similar structure, in a filter housing. The automatic drain system may be implemented on the suction side of the FWS filter system and is configured to drain (e.g., remove water) when the engine is stopped (e.g. not active), thereby allowing the automatic drain system to drain water under atmospheric pressure and before the engine is active. The removal of the collected liquid will prevent the collected liquid from entering the fuel stream and damaging downstream the fuel delivery components or the engine. Beneficially, the automatic drain system includes a compact and self-sufficient (e.g., battery) design that does not require the use of solenoid valves, complicated wiring, or excessive space. The automatic drain system may further provide a safe canister or plumbing to facilitate temporary storage of drained liquids. In some embodiments, the design of the automatic drain system produces a substantially constant mass flow rate of liquid from the FWS, through the automatic drain system, and out of the FWS.

As utilized herein, a "high pressure side" refers to the side of the fuel pump from which fuel flows, while a "suction side" refers to the side of the fuel pump to which fuel is supplied. The pressure differential between the sides of the FWS filter system provides the motive force that drives the water and fuel mixture through the FWS filter system.

Figure 1:
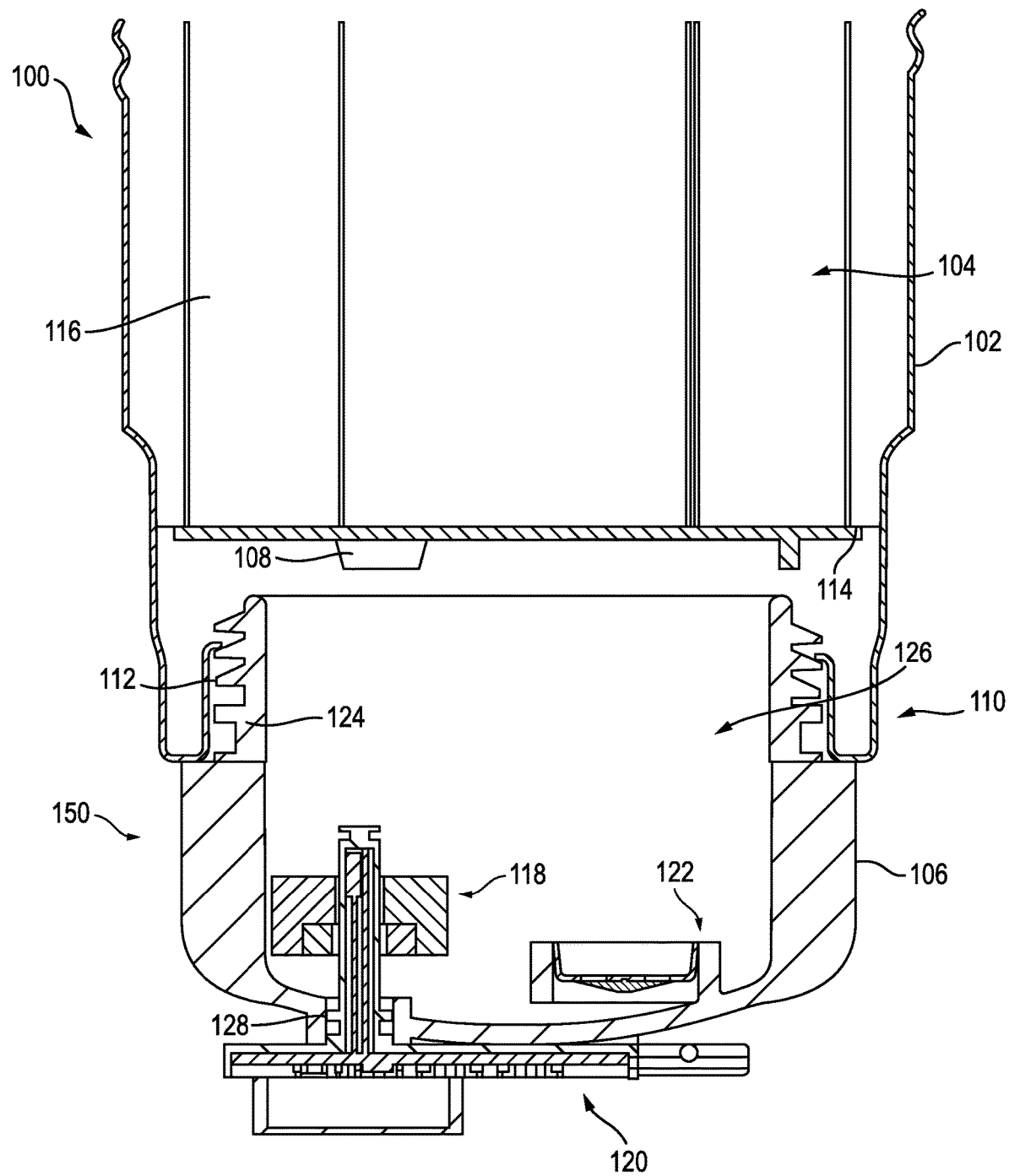
FIG. 1 is a cross-sectional view of a fuel water separator ("FWS") filter system that includes an automatic drain system, according to an example embodiment.

Turning to FIG. 1, an FWS filter system 100 with an automatic drain system 150 is shown, according to an example embodiment. The FWS filter system 100 includes a filter element 104 disposed within a filter housing 102. The FWS filter system 100 is located on a suction side of a fuel pump. The automatic drain system 150 is coupled to the filter housing 102 and is in fluid communication with a liquid drain port 108 of the filter element 104.

The FWS filter system 100 may be structured to separate two immiscible phases of a mixture (e.g., fuel or lubricant and water) into a continuous phase (e.g., herein referred to as "fuel") and a dispersed phase (herein referred to as "liquid"). As the mixture passes through the filter element 104, the dispersed phase is captured and coalesced. The liquid falls along the filter housing 102, in the direction of gravity, and axially enters a liquid collection sump 106 disposed below the filter housing 102. In some embodiments, the FWS filter system 100 comprises an inside-out coalescing filter element 104, however, in other embodiments, the FWS filter system 100 comprises an outside-in coalescing filter element 104.

The filter housing 102 defines an internal volume within which the filter element 104 is positioned. The filter housing 102 may be formed from a strong and rigid material, for example plastics (e.g., polypropylene, high density polyethylene, polyvinyl chloride, etc.), metals (e.g., aluminum, stainless steel, etc.), or any other suitable material. In particular embodiments, the filter housing 102 may comprise a cylindrical housing having generally a circular cross-sectional. In other embodiments, the filter housing 102 may have any suitable shape, for example square, rectangular, polygonal, etc.

The filter housing 102 comprises a housing first end 110 and a housing second end extending axially away from the housing first end 110. The housing first end 110 includes at least one male thread 112 provided on an inner surface thereof. In some arrangements, the at least one male thread 112 is stamped into the filter housing 102. In other arrangements, the at least one male thread 112 may be molded or otherwise formed into a sidewall of the filter housing 102.

As shown in FIG. 1, the filter element 104 includes an endplate 114 and filter media 116. In some arrangements, the filter element 104 is a cylindrical filter element. The endplate 114 includes a liquid drain port 108 that places the filter element 104 in fluid communication with the liquid collection sump 106. The liquid drain port 108 may include a seal member (e.g., O-ring or other resilient seal) between the automatic drain system 150 and the filter housing 102. A seal member may be provided to ensure a fluid tight seal is formed between the automatic drain system 150 and the filter housing 102. In some embodiments, at least one air vent is also provided in the filter housing 102 to allow air to be communicated from the interior portion of the automatic drain system 150 to the FWS filter system 100.

The filter media 116 is structured to separate two immiscible phases of a mixture into liquid and fuel or lubricant. Accordingly, as the mixture passes through the filter media 116, the liquid is captured and coalesced by the filter media 116. The coalesced liquid falls along the inside of the filter element 104, in the direction of gravity, to the liquid collection sump 106 under the filter housing 102. The liquid remains disposed in the liquid collection sump 106 unless the liquid level exceeds an amount that causes the liquid to enter the flow stream. Beneficially, the automatic drain system 150 is configured to prevent the liquid level from reaching a level that causes the liquid to enter the flow stream.

The automatic drain system 150 includes the liquid collection sump 106, a liquid-in-fuel sensor (e.g., a water-in-fuel ("WIF") sensor 118), an automatic drain valve 120, and a check valve 122. The liquid collection sump 106 is positioned at the housing first end 110, and includes a female thread 124 structured to engage the male thread 112 of the filter housing 102 so as to be coupled to the housing first end 110. The liquid collection sump 106 forms an internal cavity 126 that is in fluid communication with the liquid drain port 108 of the filter element 104 to receive the coalesced liquid from the FWS filter system 100. In some embodiments, the liquid collection sump 106 is a part of and/or formed with the filter housing 102 and is configured to receive the automatic drain system 150. In other words, the automatic drain system 150 is installed into the liquid collection sump 106.

Figure 2:
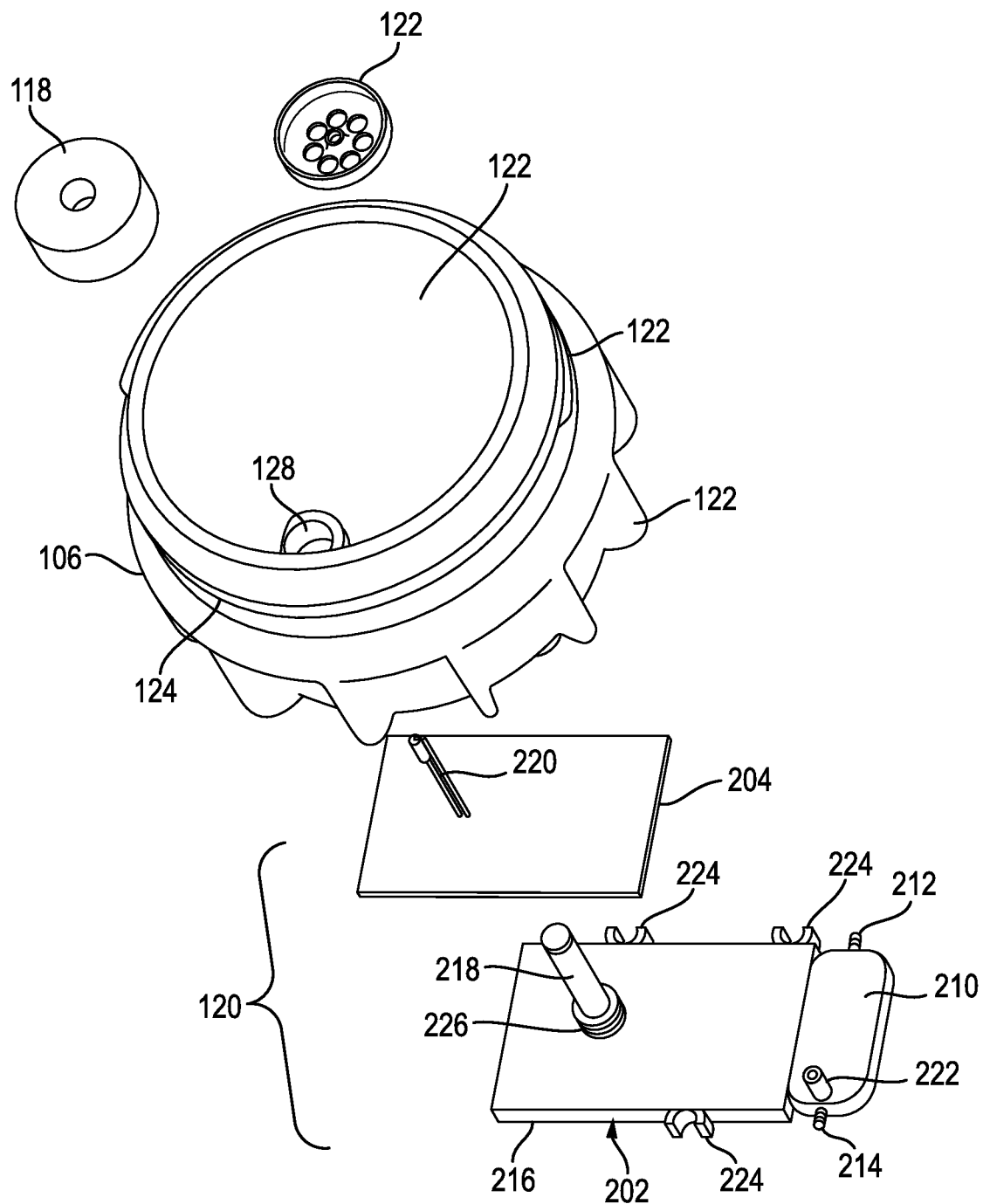
FIG. 2 is an exploded view of the automatic drain system of FIG. 1A.

Turning to FIG. 2, an exploded view of an automatic drain system 150 is shown, according to an example embodiment.

The automatic drain system 150 includes the WIF sensor 118, the check valve 122, the liquid collection sump 106, and the automatic drain valve 120. Generally, the automatic drain system 150 is structured to monitor collected liquid levels in the liquid collection sump 106 through the WIF sensor 118. The automatic drain valve 120 is configured to facilitate the removal of the collected liquid from the liquid collection sump 106, thereby preventing the collected liquid from entering the fuel stream and damaging downstream the fuel delivery components or the engine. The automatic drain system 150 may further provide a safe canister or plumbing to facilitate temporary storage of drained liquids. As shown in FIG. 1, the automatic drain valve 120 is located at the base of the liquid collection sump 106 and protrudes through a sump opening 128 into the internal cavity 126 of the liquid collection sump 106. As will be appreciated, the automatic drain system 150 may protrude into the liquid collection sump 106 in order to accurately monitor the liquid level.

The WIF sensor 118 is configured to monitor the liquid level within the internal cavity 126 of the liquid collection sump 106. A wide variety of WIF sensors and/or liquid level sensors may be implemented with the automatic drain system 150 to monitor liquid level and/or trigger the pump 210. The check valve 122 is configured to prevent placing the pump 210 under suction.

The liquid collection sump 106 includes the sump opening 128 to receive the protruding element 218 of the automatic drain valve 120. In some embodiments, the protruding element 218 includes a seal member 226 configured to form a seal between the protruding element 218 and sump opening 128. As shown below in FIG. 3D, the liquid collection sump 106 includes a liquid outlet 330 and may include at least one sump drain opening. As shown in FIG. 2, the liquid collection sump 106 includes a plurality of ribs 230 disposed axially along an external surface of the liquid collection sump 106. The plurality of ribs 230 are configured to facilitate the removal and installation of the liquid collection sump 106 (e.g., grips). In some arrangements, the liquid collection sump 106 may be formed from at least one of a translucent or a transparent material, for example, thin plastic, plexiglass, acrylic, etc. The transparent, substantially transparent or translucent liquid collection sump 106 may allow a user to visually observe if water or any other contaminants are accumulated in the liquid collection sump 106. In other arrangements, the liquid collection sump 106 may be formed from an opaque material, such as plastic or metal.

The automatic drain valve 120 includes a pump 210, a battery 216, and a circuit board 204 disposed within an automatic drain valve housing 202. The automatic drain valve housing 202 includes a protruding element 218, a pump inlet 222, a first pump outlet 212, a second pump outlet 214, and a plurality of engagement elements 224. In some embodiments, the circuit board 204 may include a controller.

The circuit board 204 includes a sensing element 220 disposed within a protruding element 218 of the automatic drain valve housing 202. The sensing element 220 is operably connected and/or in communication with the WIF sensor 118 such that when the WIF sensor 118 identifies a liquid level or is at a liquid level, the sensing element 220 is triggered. The circuit board 204 is configured to activate when the liquid in the liquid collection sump reaches a level that requires draining (e.g., "desired sump capacity"). In other words, the desired sump capacity level is the liquid level of the collected liquid for which it is preferred to drain the liquid collection sump 106 to avoid the collected liquid from entering the fuel stream and damaging the engine or components downstream. In some embodiments, the desired sump capacity is between 40% and 70% of the capacity of the liquid collection sump 106, for example, at 60% of the capacity of the liquid collection sump 106. Once activated, the circuit board 204 may be configured to convert direct current ("DC") power of a battery 216 into alternating current ("AC") current with high voltage to drive a pump 210. In some embodiments, the circuit board 204 may pass DC power of the battery 216 to the pump 210, in other embodiments, the circuit board may pass AC power of the battery 216 to the pump 210, and in some embodiments, the circuit board 204 may convert AC power of the battery 216 to DC power to drive the pump 210.

The pump 210 is configured to receive power from the battery 216 by way of the circuit board 204. The pump 210 is configured to be a low power consumption such that the battery 216 is sufficient to efficiently and effectively run the pump 210. The pump 210 is configured to drain liquid from the internal cavity 126 of the liquid collection sump 106 through the liquid outlet 330. A check valve may be disposed between the pump 210 and the liquid outlet 330 to allow for pumping in one direction (e.g., out of the liquid collection sump 106). The pump 210 is in fluid communication with the first pump outlet 212 and the second pump outlet 214. In some embodiments, a check valve may be disposed in one or both of the first pump outlet 212 and the second pump outlet 214 to prevent subjecting the pump 210 to a vacuum.

Figure 3A:
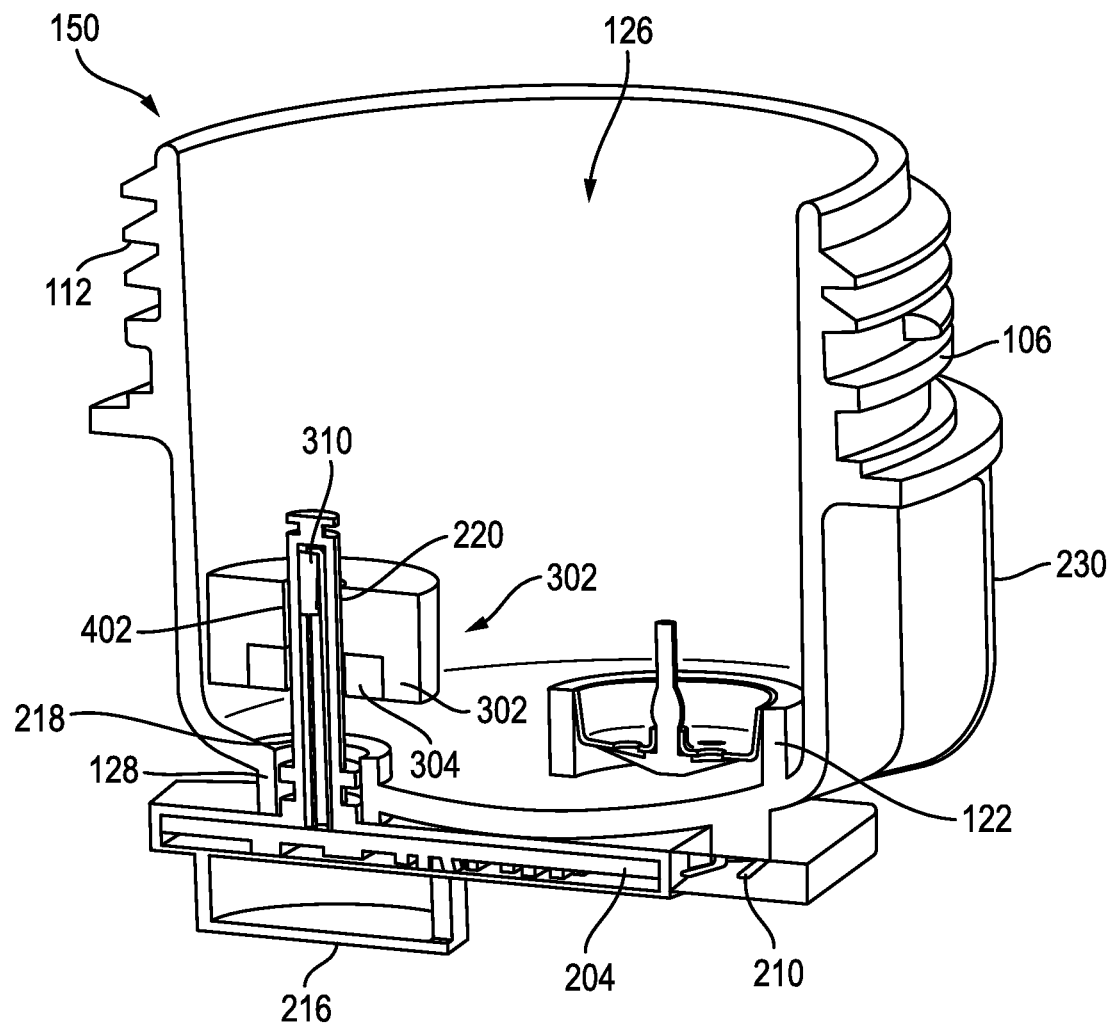
FIG. 3A is a cross-sectional perspective view of an automatic drain system, according to an example embodiment.

Referring to FIG. 3A, a cross-sectional perspective view of an automatic drain system 150 is shown, according to an example embodiment. The WIF sensor 118 is configured to monitor if the liquid level in the liquid collection sump 106 reaches a desired sump capacity level and is configured to trigger the sensing element 220. As shown in FIG. 3A, the WIF sensor 118 includes a float element 302 (e.g., float valve) and a magnetic element 304. The float element 302 is configured to have a density that causes the float element to float in water but sink in diesel or similar fluid. The float element 302 may be disk-shaped. The magnetic element 304 is configured to "activate" or "trigger" the sensing element 220. As shown in FIG. 3A, the magnetic element 304 is coupled to the float element 302 at a position associated with the desired sump capacity so that the magnetic element 304 will be adjacent to or near enough to the sensing element 220 to trigger it. The magnetic element 304 may be coupled to an external top, bottom, or side surface of the float element, disposed in an external cavity of the float element 302 or disposed internally of the float element 302. As will be appreciated, once the engine is off and the vehicle is stationary, water will separate from the fuel and cause the float element 302 to rise. Once the float element 302 rises to the desired sump capacity level (e.g., a first position) the magnetic element 304 will activate the sensing element 220. Once an amount of liquid has been removed, the float element 302 will drop below the desired sump capacity level (e.g., a second position) and the magnetic element 304 will no longer activate the sensing element 220. In some embodiments, the magnetic element 304 comprises a material, apparatus, or activating element that forms a wireless (e.g., non-wired) connection, bridge, or communication with the sensing element 220.

The sensing element 220 is disposed internal of the protruding element 218 and extends into the internal cavity 126 of the liquid collection sump 106. The sensing element 220 includes a magnetic switch 310 that is configured to be activated by the magnetic element 304 on the float element 302 at a specific height associated with the desired sump capacity level. For example, in some embodiments, the magnetic element 304 of the WIF sensor 118 is raised by the liquid accumulating within the liquid collection sump 106 to the desired sump capacity level at which point the magnetic switch 310 is activated bridging a circuit 402 (e.g., of the circuit board 204) between the battery 216 and the pump 210, thereby activating the pump 210. The automatic drain system 150 will then drain the liquid collection sump 106 under atmospheric pressure. In some embodiments, the sensing element 220 includes a second switch that triggers the deactivation of the pump 210 (e.g., breaks the bridge). In other embodiments, the circuit board 204, pump 210, and/or battery 216 are configured to operate for a specified time.

While the WIF sensor 118 is shown as a float-magnet sensor, a wide variety of WIF sensor configurations may be implemented with the automatic drain system 150. In some embodiments, the WIF sensor 118 includes an upper WIF sensor and a lower WIF sensor, where the detection of liquid by the upper WIF sensor indicates that the liquid level in the liquid collection sump 106 has reached a level where draining is required and the absence of liquid by the lower WIF sensor may the pump to stop operation, thereby completing the draining process. In the absence of a lower WIF sensor, a timed release may be implemented with a predetermined open time calculated from a timer algorithm of a predetermined liquid density and quantity of typical precipitate/liquid. In other embodiments, the WIF sensor 118 or other sensors may be similar to the sensors described in U.S. Pat. No. 10,031,098, issued Jul. 24, 2018 and the contents of which are incorporated by reference in its entirety. The WIF sensor 118 or other sensors can comprise a sensor tube that includes tube wires that extend through a connection block and the resistance of the tube segment above the fluid level is infinite because the air between the tube wires acts as an insulator. Accordingly, the higher the fluid level, the less resistance between the tube wires, and thereby the lower the voltage at a DC voltmeter. In some embodiments, the water-in-fuel sensor 118 also comprises an electronic coupler structured to allow communicative coupling of the water-in-fuel sensor 118 and the circuit board 204.

Figure 3C:
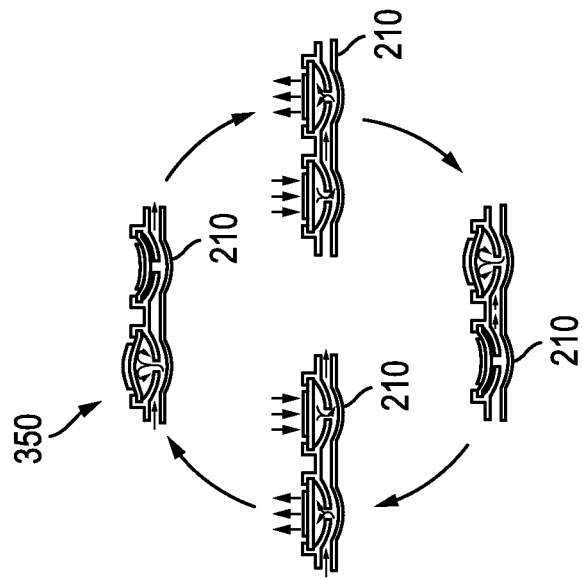
FIG. 3C is a view of a pump cycle of the pump of the automatic drain system of FIG. 3A.
Figure 3B:
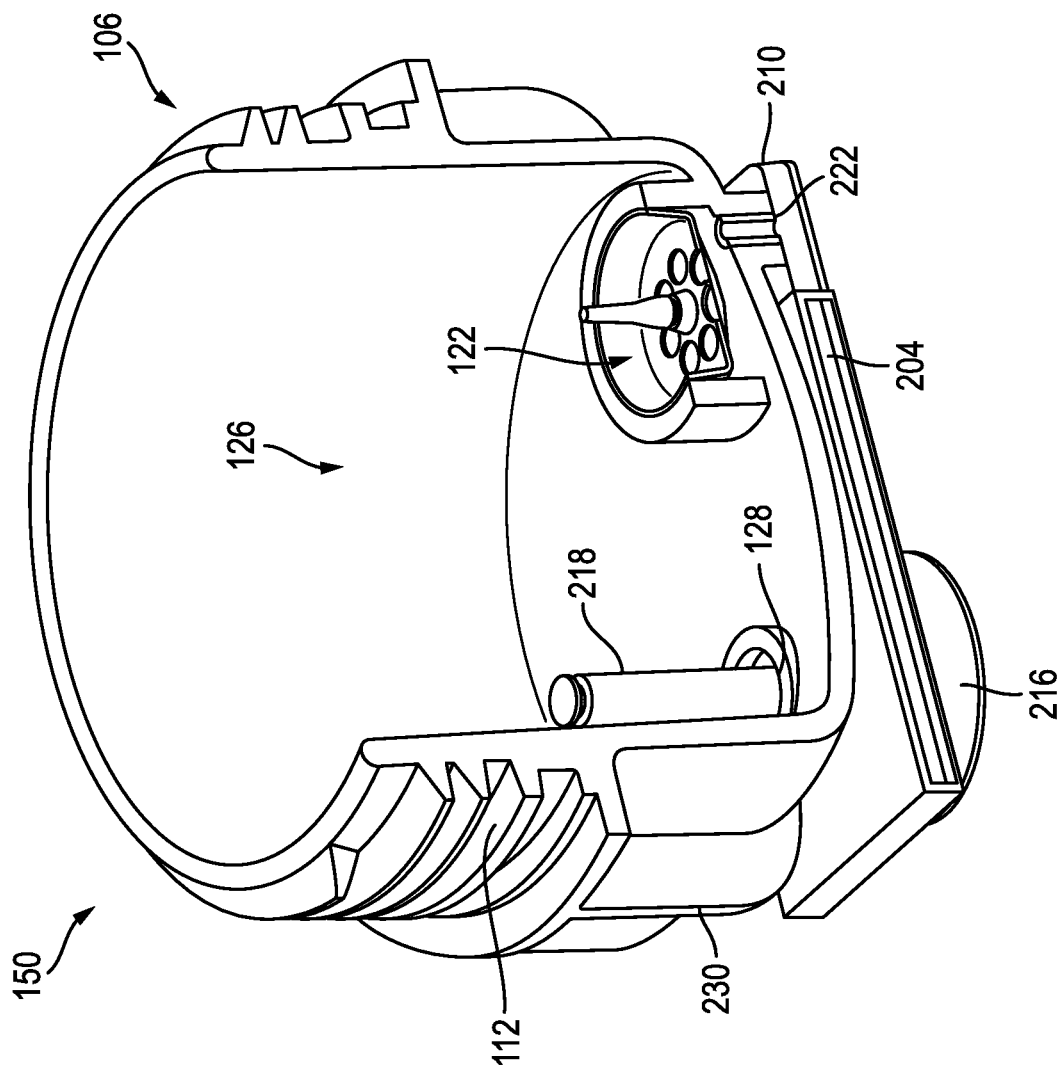
FIG. 3B is a cross-sectional perspective view of the automatic drain system of FIG. 3A.

As shown in FIG. 3B, the pump 210 is in fluid communication with the internal cavity 126 of the liquid collection sump 106 through the pump inlet 222. The pump inlet 222 extends from a surface of the automatic drain valve housing 202. Once the circuit 402 is closed (e.g., the magnetic element 304 triggers or closes the magnetic switch 310) power will flow from the battery 216, through the circuit board 204, and to the pump 210. Once active, the pump 210 draws liquid from the internal cavity 126, through the pump inlet 222, and through the first pump outlet 212 and/or the second pump outlet 214. The first pump outlet 212 and/or the second pump outlet 214 may be in fluid configuration with a tank, secondary container, or outside of the FWS filter system 100. Any one of the pump inlet 222, first pump outlet 212, and second pump outlet 214 may include a check valve along each respective flow path. As will be appreciated, a check valve along the pump inlet 222 prevents placing the pump 210 under suction. A check valve along the first pump outlet 212 or second pump outlet 214 facilitates pumping in one direction.

A pump cycle 350 of the pump 210 is shown in FIG. 3C. The pump 210 may cycle between an active state that causes the pump 210 to draw liquid in from the pump inlet 222 and direct liquid toward the first pump outlet 212 or second pump outlet 214 when the circuit 402 is closed and provides power.

The pump cycle 350 may include blocking one or more openings in the liquid collection sump 106, alternating the suction in one or more openings in the liquid collection sump 106, or having a check valve disposed in fluid communication with one or more openings in the liquid collection sump 106 to prevent back flow. In some embodiments, the pump 210 is a positive piezoelectric pump.

Figure 3D:
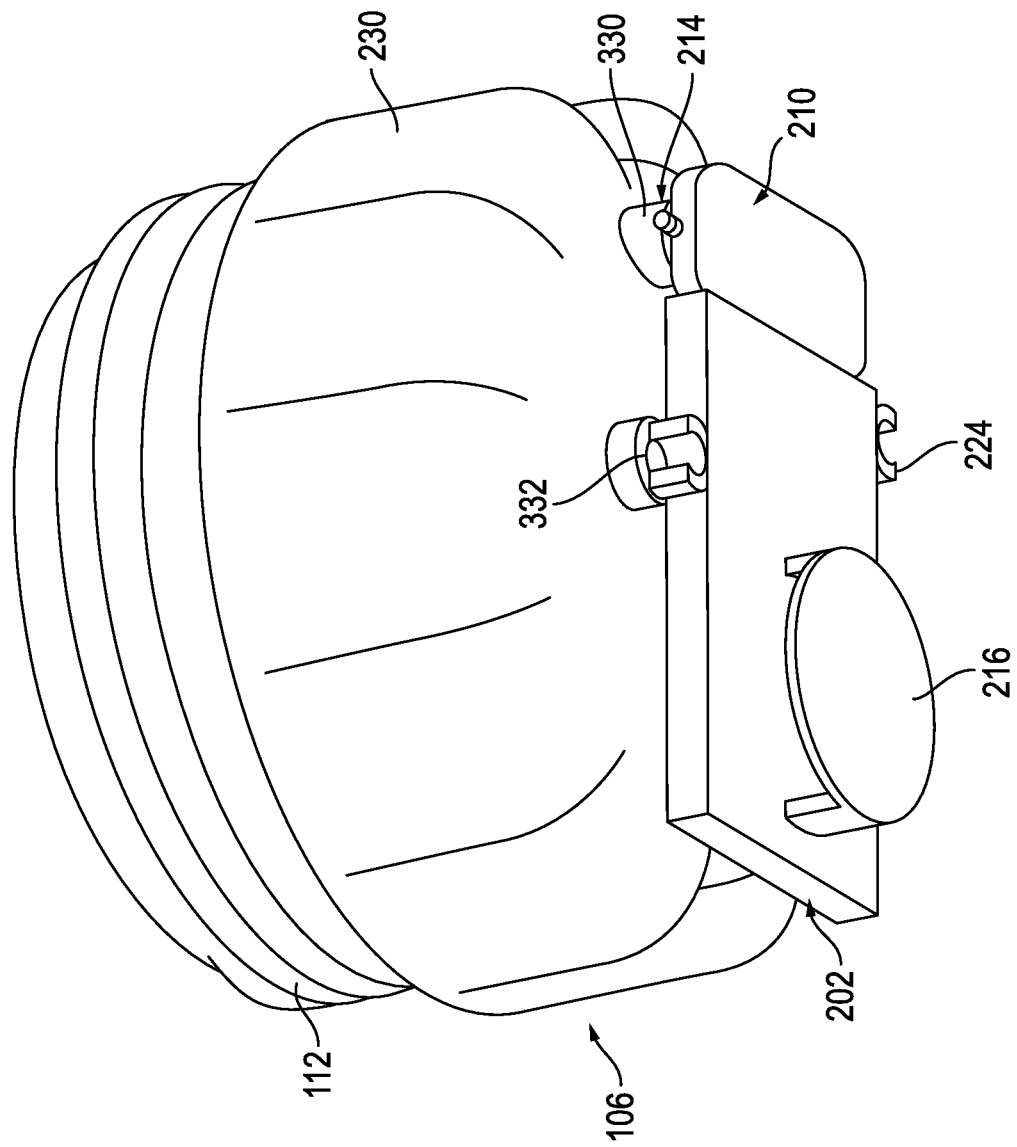
FIG. 3D is a bottom perspective view of the automatic drain system of FIG. 3A.

Referring to FIG. 3D, a bottom perspective view of the automatic drain system 150 of FIG. 3A is shown. In some embodiments, the liquid collection sump 106 may include an engagement opening 332 that is configured to secure the automatic drain valve 120 to the liquid collection sump 106. As shown in FIG. 3D, the battery 216 is a disc or coin-shaped battery. The battery 216 is configured to supply enough power to operate the pump 210 for the desired period of time.

Figure 4A:
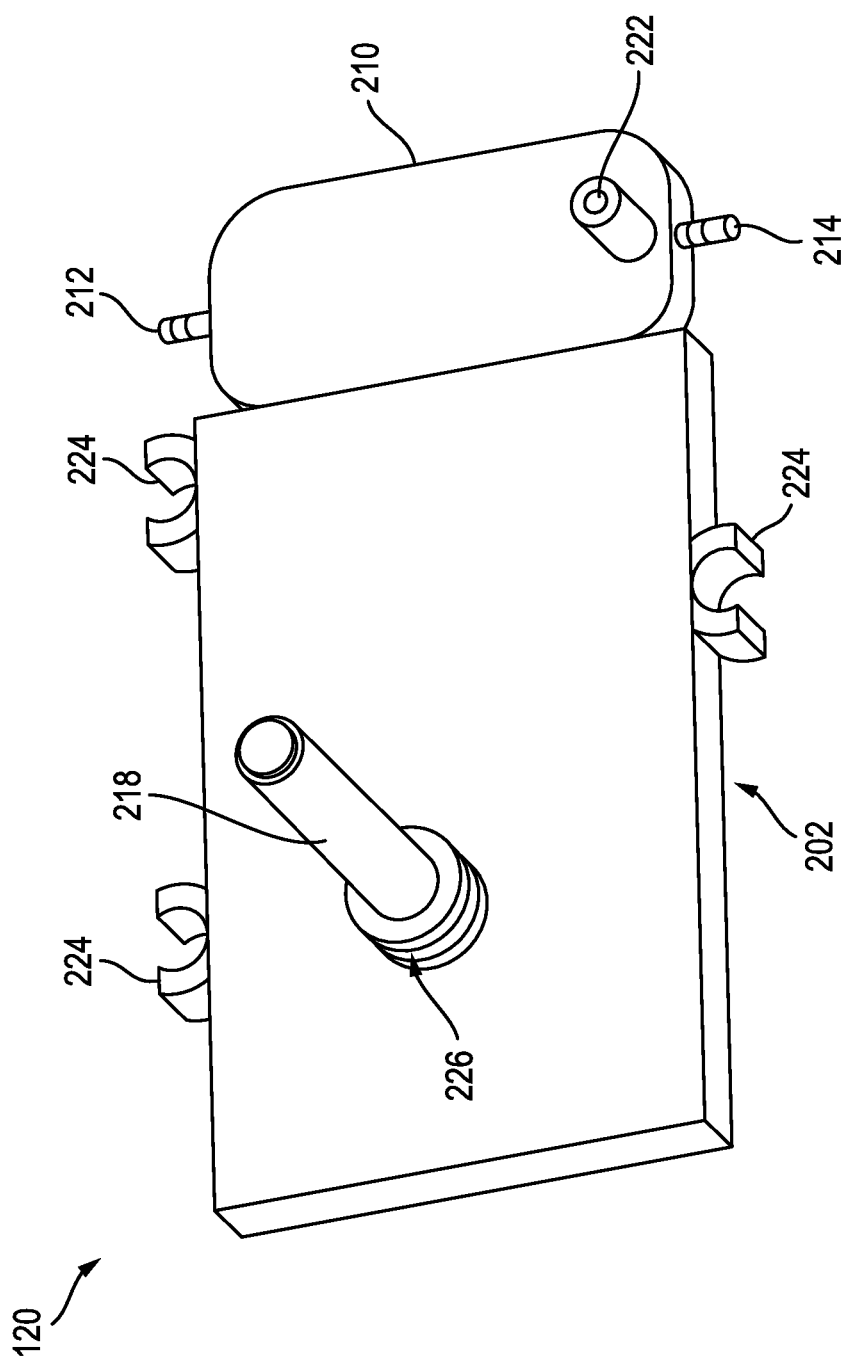
FIG. 4A is a perspective view of the automatic drain valve, according to an example embodiment.
Figure 4B:
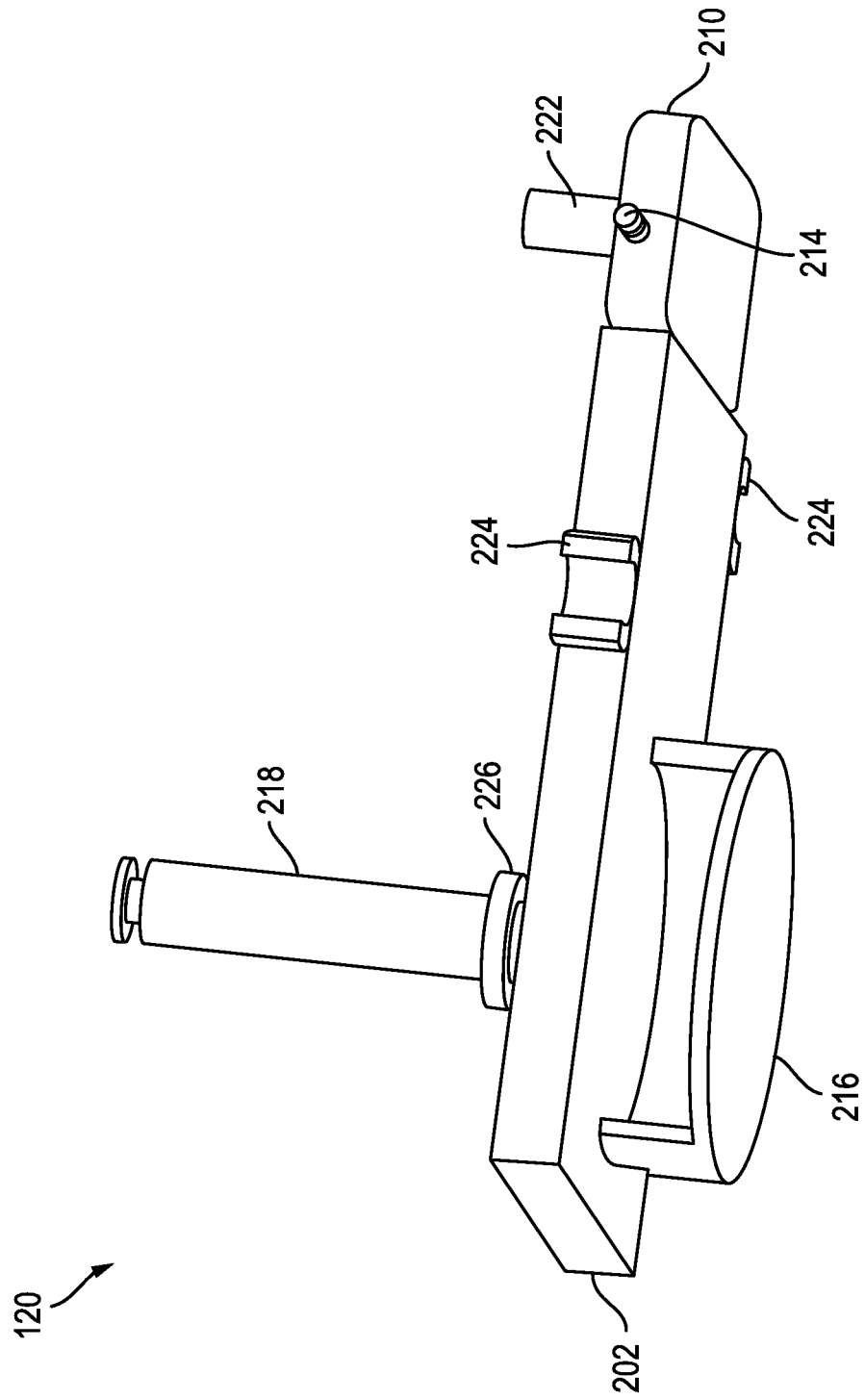
FIG. 4B is a perspective view of the automatic drain valve of FIG. 4A.

FIGS. 4A and 4B are perspective views of the automatic drain valve 120. Beneficially, the automatic drain valve 120 may be a self-contained self-sufficient unit. In such embodiments, the automatic drain valve 120 may not include any external wires or connections with a wiring harness. Additionally, the automatic drain valve 120 may need to be interfaced with an ECU or other control system to properly and automatically drain the FWS filter system 100. This independent nature of the automatic drain valve 120 allows the automatic drain valve 120 to be employed with both electronically controlled and mechanically controlled engine systems. In some embodiments, the automatic drain valve 120 may be retrofitted onto a pre-existing FWS filter system 100.

Figure 4C:
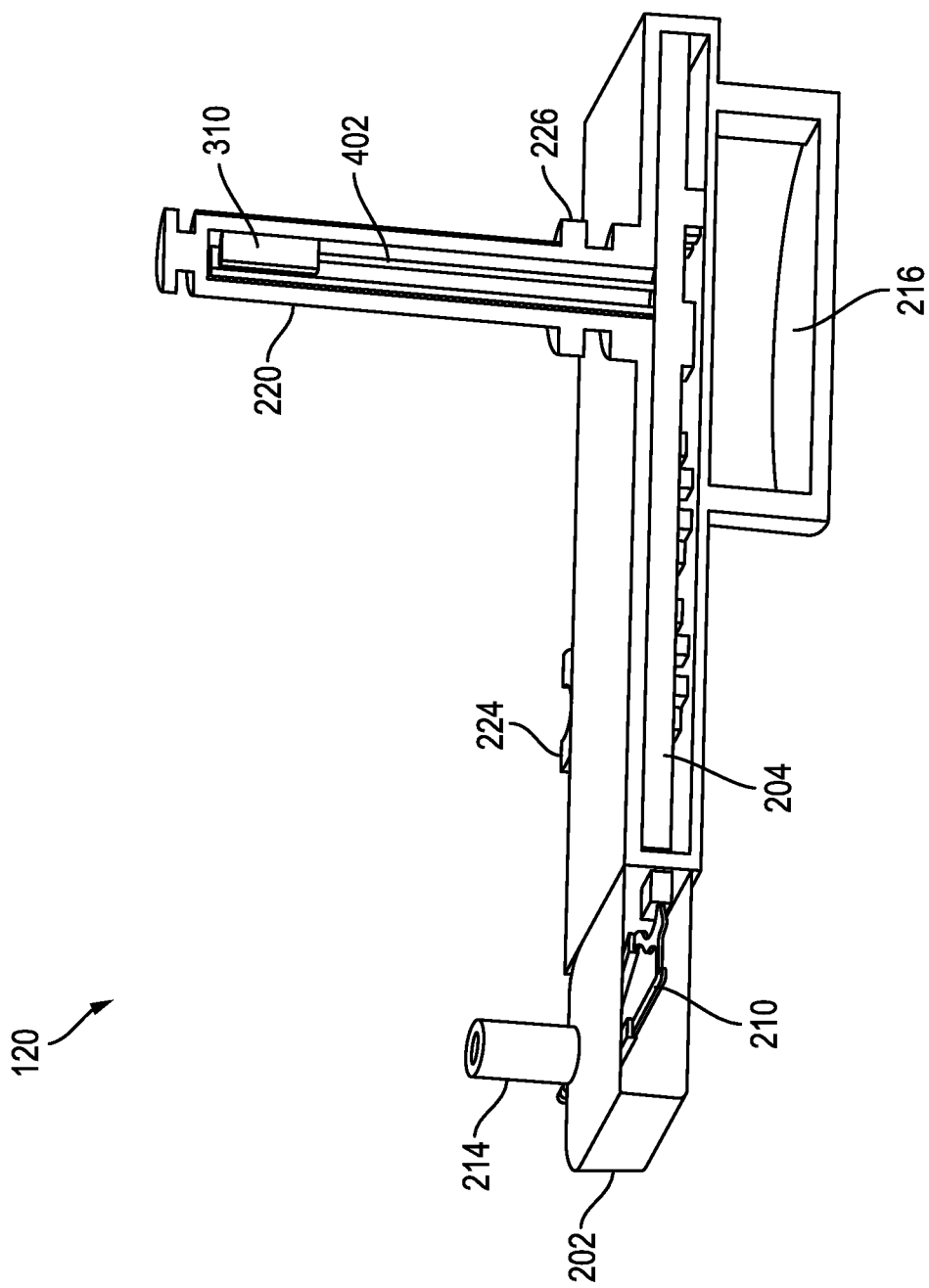
FIG. 4C is a cross-sectional view of the automatic drain valve of FIG. 4A.

FIG. 4C shows a cross-sectional view of the automatic drain valve of FIG. 4A including the magnetic switch 310 that, when activated by the magnetic element 304 closes and/or branches the circuit 402. As shown, the protruding element 218 extending axially away from a top surface of the automatic drain valve housing 202. The pump inlet 222 may be disposed laterally away from the protruding element 218, over the pump 210, and extends axially upward away from the pump 210. The first pump outlet 212 may be disposed opposite of the second pump outlet 214. Both the first pump outlet 212 and the second pump outlet 214 may extend away from a side surface of the automatic drain valve housing 202.

The operations described in this specification can be performed by a circuit board, controller or a data processing apparatus on data stored on one or more computer-readable storage devices or received from other sources. The term "data processing apparatus" or "controller" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed:

1. A filtration system comprising:
   a filter housing defining an internal volume, the filter housing comprising a housing first end and a housing second end positioned axially away from the housing first end;
   a filter element positioned within the internal volume, the filter element comprising a first endplate, a second endplate positioned axially away from the first endplate, and filter media extending from the first endplate toward the second endplate, the first endplate comprising a liquid drain port;
   a water sump positioned at the housing first end, the water sump defining an internal cavity in fluid communication with the liquid drain port and comprising a sump opening; and
   an automatic drain system coupled to the water sump, the automatic drain system comprising:
      a liquid-in-fuel sensor, the liquid in-fuel sensor configured to detect a liquid level in the internal cavity of the water sump; and
      an automatic drain valve located at a base of the water sump and protruding through the sump opening into the internal cavity of the water sump, the automatic drain valve comprising:
         an automatic drain valve housing having a protruding element received within the sump opening;
         a pump disposed within the automatic drain valve housing and comprising an inlet in fluid communication with the internal cavity of the water sump and an outlet in fluid communication with the inlet, the pump having an active state and an inactive state, the active state causing the pump to draw liquid in from the inlet and direct liquid toward the outlet;
         a battery disposed within the automatic drain valve housing and configured to power the pump; and
         a circuit board disposed within the automatic drain valve and operably connected to the pump and operably connected to the battery, the circuit board comprising at least one circuit having a first state and a second state, the first state preventing power flow from the battery to the pump and the second state facilitating power flow from the battery to the pump,
      wherein detection of the liquid level reaching a desired sump capacity level by the liquid-in-fuel sensor causes the circuit board to transition from the first state to the second state, thereby causing the pump to transition from the inactive state to the active state.

2. The filtration system of claim 1, wherein the inlet includes a check valve.

3. The filtration system of claim 1, wherein the outlet includes a check valve.

4. The filtration system of claim 1, wherein the inlet includes a first check valve and the outlet includes a second check valve, the second check valve configured to prevent a vacuum acting on the pump.

5. The filtration system of claim 1, wherein the outlet is a first outlet, wherein the inlet is positioned laterally away from the liquid in-fuel sensor and axially above the pump, and the first outlet extending away from a side surface of the automatic drain system, and further comprising a second outlet that is disposed opposite of the first outlet.

6. The filtration system of claim 1, wherein the water sump comprises a sump first end and a sump second end positioned axially away from the sump first end, wherein a sump internal volume is defined between the sump first end and sump second end, the sump second end defining the sump opening configured to receive the liquid-in-fuel sensor.

7. The filtration system of claim 6, wherein the housing first end comprises a male thread provided on an inner surface thereof and the water sump first end comprises a female thread configured to engage the male thread of the filter housing so as to couple the water sump to the filter housing.

8. The filtration system of claim 6, wherein the automatic drain system comprises a plurality of engagement elements along an outer surface of the automatic drain system, the plurality of engagement elements configured to couple to an outer surface of the sump second end.

9. The filtration system of claim 1, wherein the liquid-in-fuel sensor comprises a float element and an activation element coupled to the float element, the float element movable between a first position and a second position, wherein the activation element is configured to cause the at least one circuit to transition from the first state to the second state when the float element is in the first position.

10. The filtration system of claim 9, wherein the at least one circuit is coupled to a magnetic switch and wherein the activation element is a magnetic element, the magnetic switch activated when the magnetic element is adjacent the magnetic switch, and wherein activation of the magnetic switch causes the at least one circuit to transition from the first state to the second state.

11. The filtration system of claim 9, wherein the activation element is configured to cause the at least one circuit to transition from the second state to the first state when the float element transitions from the first position to the second position.

12. The filtration system of claim 1, wherein the liquid-in-fuel sensor comprises a float element and an activation element coupled to the float element, the float element movable between a first position and a second position, the activation element is configured to cause the at least one circuit to transition from the first state to the second state when the float element is in the first position and the activation element is configured to cause the at least one circuit to transition from the second state to the first state when the float element is in the second position, wherein the second position is axially below the first position.

* * * * *